M. L. DE WITT.
TOASTER AND WARMER.
APPLICATION FILED APR. 10, 1918.

1,297,549.

Patented Mar. 18, 1919.

M. L. DeWitt
Inventor

Witness

By C. A. Snow & Co.
Attorneys

UNITED STATES PATENT OFFICE.

MELVILLE L. DE WITT, OF HOLLISTON, MASSACHUSETTS.

TOASTER AND WARMER.

1,297,549.  Specification of Letters Patent.  Patented Mar. 18, 1919.

Application filed April 10, 1918. Serial No. 227,734.

*To all whom it may concern:*

Be it known that I, MELVILLE L. DE WITT, a citizen of the United States, residing at Holliston, in the county of Middlesex and State of Massachusetts, have invented a new and useful Toaster and Warmer, of which the following is a specification.

The subject of this invention is a toaster and warmer intended for use in warming and toasting bread and for like purposes.

The main object of the invention is the provision of means for retaining the heat to hasten the operation of toasting or warming bread and like substances.

A still further object of the invention is the provision of means for holding articles in place in the warmer and toaster.

It is also within the province of the invention to generally improve the construction and enhance the utility of articles of the character set forth.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

A practical embodiment of the invention is shown in the accompanying drawing, wherein:—

Figure 1:
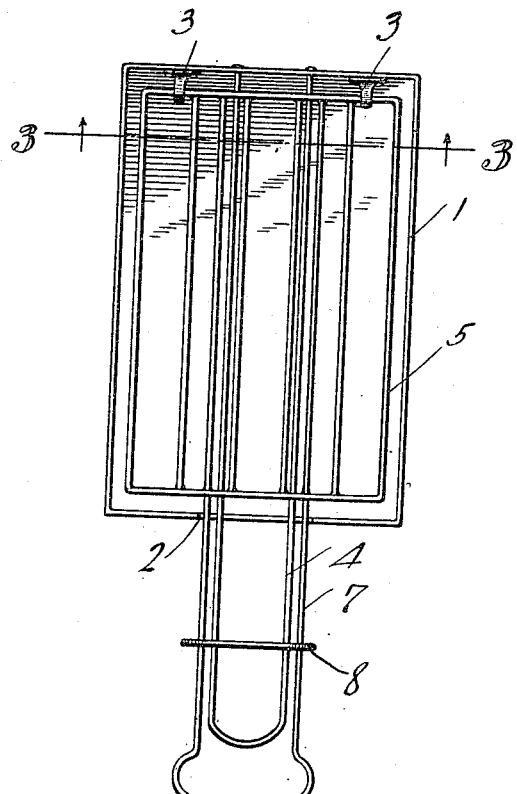
Figure 1 is a plan view of a toaster constructed in accordance with the invention.
Figure 2:
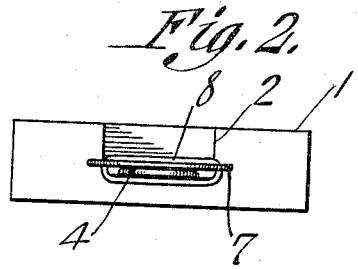
Fig. 2 is an end elevation of the same.
Figure 3:
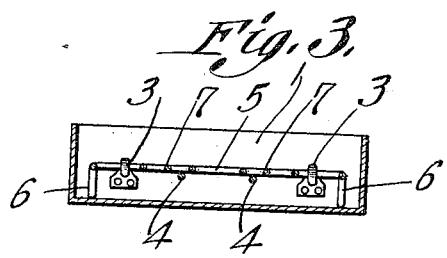
Fig. 3 is a cross section taken on the line 3—3 of Fig. 1.

In carrying out the invention there is provided a casing or housing 1 which may be of any preferred form, but is herein shown as rectangular, and which is opened at one face. In one end of this casing an aperture or open slot 2 is formed. Secured to the opposite end of the casing are the inwardly projecting hooks 3. A handle 4, by preference formed of a looped strand of wire, is riveted or otherwise secured to the casing 1, from which it projects longitudinally adjacent the aperture 2.

A grid 5 is adapted to be detachably placed within the casing 1 and one end cross bar of the grid is positioned beneath the hooks 3. Depending from each end of this cross bar are legs 6 which are adapted to contact the back of the casing 1, when the grid is in position, and hold the cross bar of the grid firmly in place beneath the hooks. A looped wire handle 7 is secured to the grid, from which it projects longitudinally, and is adapted to lie within the aperture 2 and contiguous the handle 4. A loop or link 8 encircles the handle 7, upon which it is slidable, and is adapted to be moved to position to embrace the handle 4, when the grid is in position within the housing, for the purpose of binding the parts together.

Bread, or other material to be warmed, is placed between the grid and the wires within the casing 1 and the casing turned with its open face toward the fire and so held until the articles are warmed to the desired degree.

Having thus described the invention, what is claimed as new and sought by Letters Patent, is:—

A toaster and warmer, including a casing having an open face, hooks extending inwardly from one end of the casing, wires extending across the casing and constituting food supporting means, said wires projecting beyond the casing to form a handle, a grid extending across the hooks and within the casing, a handle at one end of the grid, and legs upon the other end of the grid and movable into engagement with one wall of the casing, when the grid is swung toward the wires, thereby to press one end of the grid into engagement with the hooks.

In testimony that I claim the foregoing as my own, I have hereto affixed my signature in the presence of two witnesses.

MELVILLE L. DE WITT.

Witnesses:
  MAE H. GLEASON,
  JOHN P. DRISCOLL.

Copies of this patent may be obtained for five cents each, by addressing the "Commissioner of Patents, Washington, D. C."